Aug. 12, 1958     J. J. GASPAROTTI     2,847,199
MOTOR CUT-OFF FOR ELECTRICAL MIXING APPLIANCE
Filed July 5, 1956     3 Sheets-Sheet 1
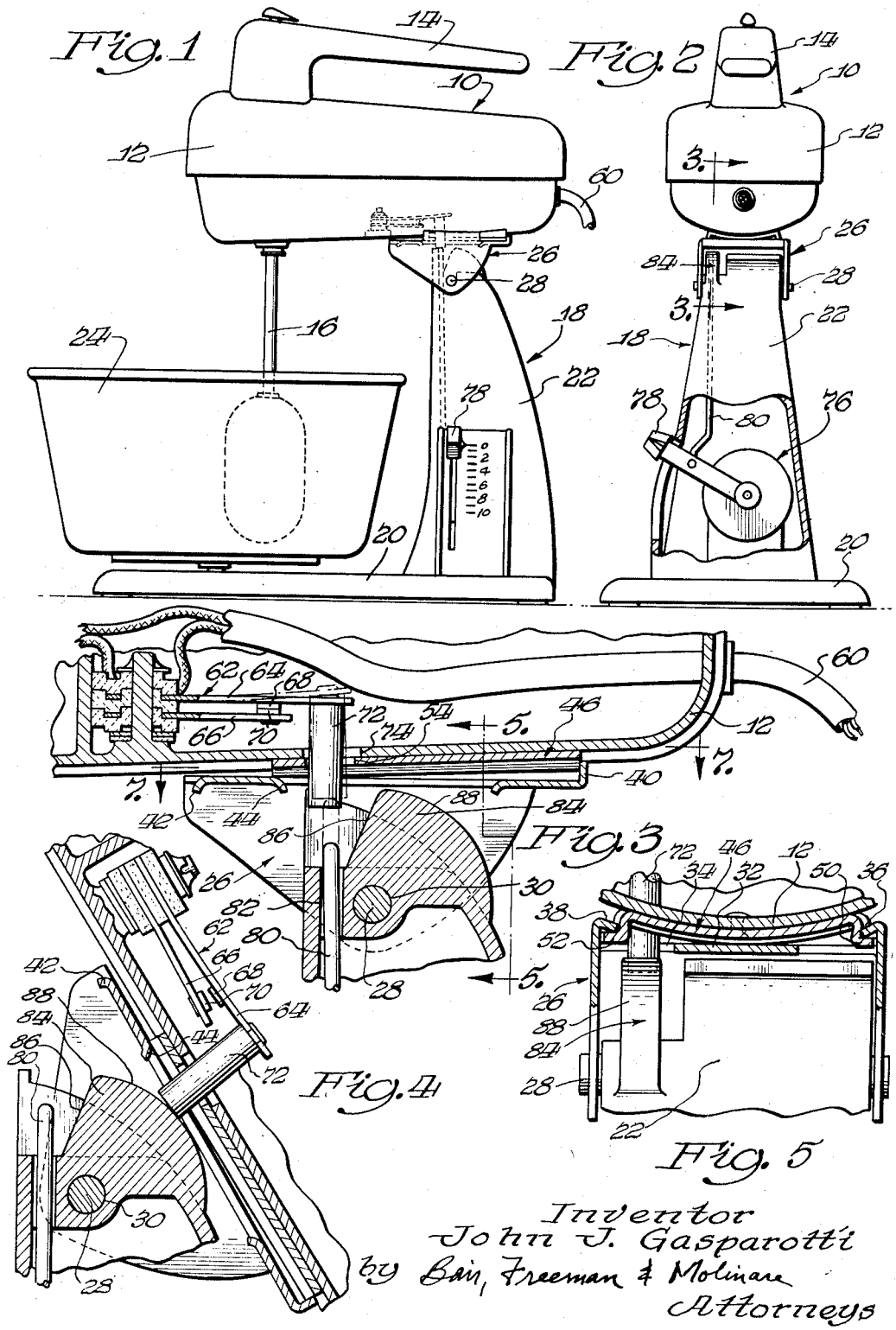
Inventor
John J. Gasparotti
by Bair, Freeman & Molinare
Attorneys Aug. 12, 1958  J. J. GASPAROTTI  2,847,199
MOTOR CUT-OFF FOR ELECTRICAL MIXING APPLIANCE
Filed July 5, 1956  3 Sheets-Sheet 2
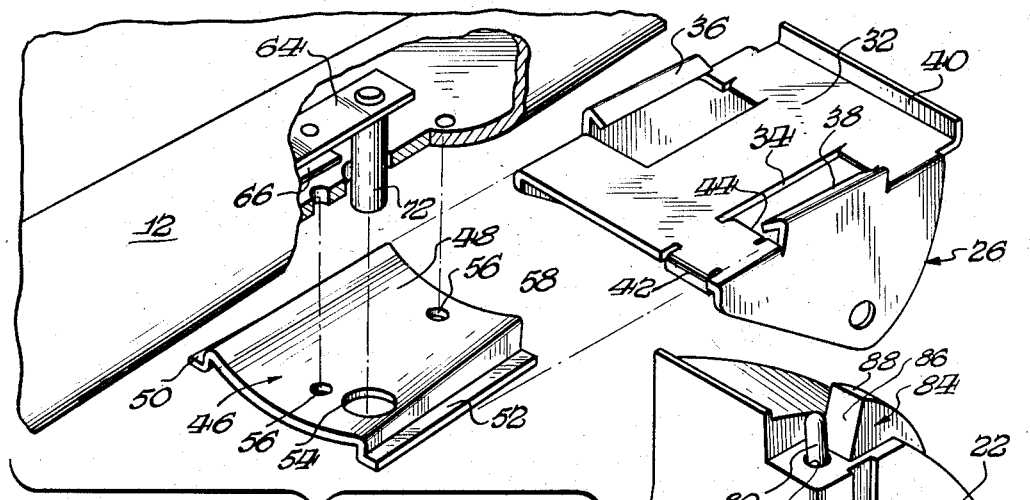
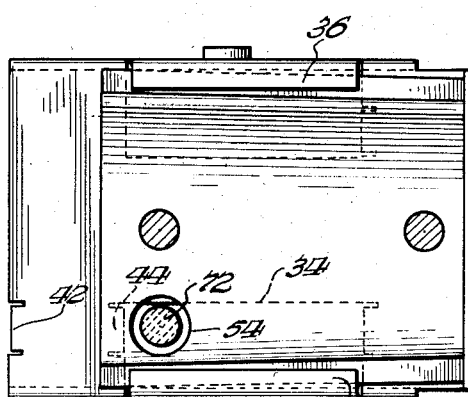
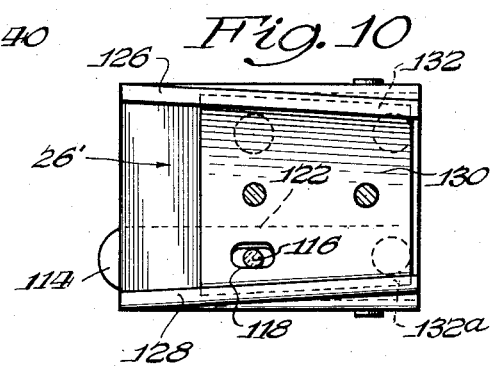
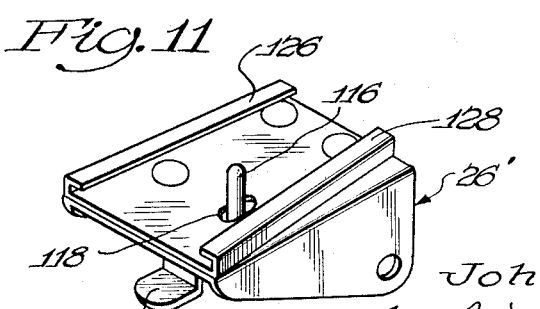
Inventor
John J. Gasparotti
by Bair, Freeman & Molinare
Attorneys

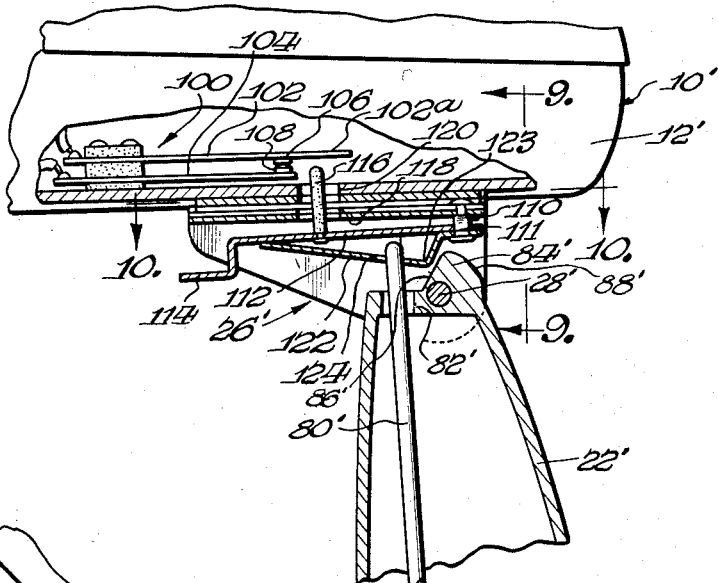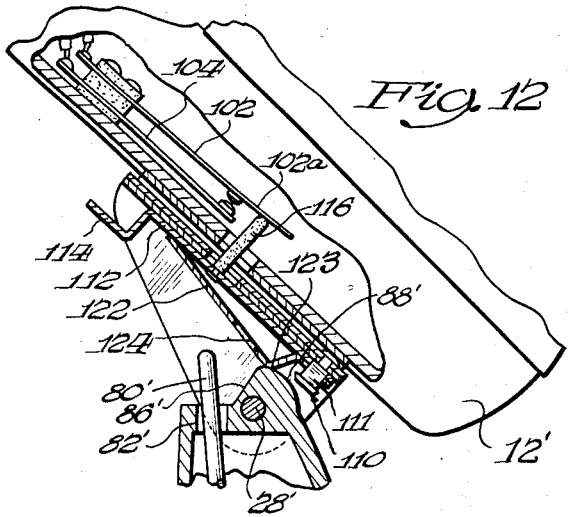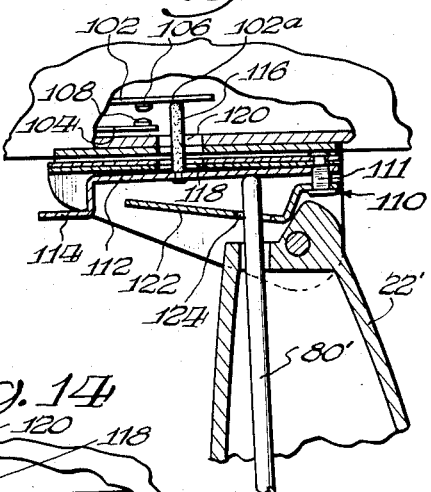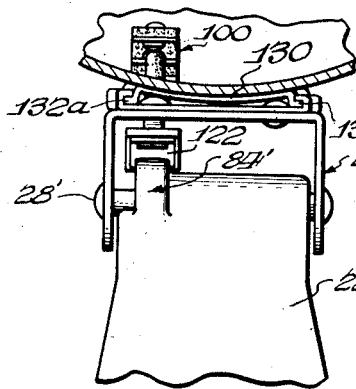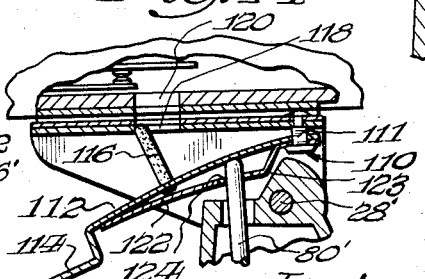

United States Patent Office 2,847,199
Patented Aug. 12, 1958

2,847,199

MOTOR CUT-OFF FOR ELECTRICAL MIXING APPLIANCE

John J. Gasparotti, St. Louis, Mo., assignor to Knapp-Monarch Company, St. Louis, Mo., a corporation of Delaware Application July 5, 1956, Serial No. 596,036

11 Claims. (Cl. 259—135)

This invention relates to an electrical mixing appliance and more particularly to cut-off means for de-energizing said electrical mixing appliance under predetermined conditions of operation.

It is known in the prior art to provide electrical appliances for the mixing and blending of foods, liquids, and the like. Conventionally, such appliances comprise a housing having a motor therein, a number of beaters adapted to be attached to the housing and driven by the motor and a support stand for maintaining the housing in proper operating position, in relation to a bowl or receptacle holding the food, to the support stand so that the beaters may be tilted back out of the bowl for convenience in placing and removing the bowl, or in adding or removing foods to said bowl.

As described in a copending application for Letters Patent, Serial No. 516,665, by Robert S Knapp, filed June 20, 1955, a timer may be incorporated in such a mixing appliance so that the mixing may be set to take place during a pre-selected time interval, and whereby the mixer will be shut off automatically after the lapse of such time interval without the necessity of attending to or watching the mixing appliance.

Manifestly, if the motor housing is tilted back so that the beaters are lifted out of the bowl while the timer is still running, the food being mixed will tend to splatter and thereby soil clothing and/or furniture in the vicinity of the mixer.

Therefore, it is an object of this invention to provide an improved mixing appliance having automatic splatter prevention cut-off means.

It is another object of this invention to provide an electrical mixing appliance having a cutoff switch adapted to automatically turn off the mixing motor when the motor housing is tilted to the non-mixing position.

It is still another object of this invention to provide an improved electrical mixing appliance having a motor housing, motor energizing switch contacts within the housing, a support stand upon which the housing is pivotally mounted, and means arranged to cooperate with said motor energizing switch contacts, whereby the switch contacts are opened to de-energize the motor when the motor housing is tilted back.

It is a further object of this invention to provide an improved electrical mixing appliance including a timer incorporated therein for running the mixer for pre-selected time intervals, and further including cut-off means for de-energizing the mixer whenever the motor unit is tilted back to nonmixing position before the timer has run out.

It is still a further object of this invention to provide an electrical mixing appliance having a splatter preventing cut-off means which is characterized by its simplicity and economy of construction and by its efficiency and reliability of operation.

One of the essential features of the invention herein lies in the provision of a control switch for the beater motor, which control switch has a control button extending outwardly of the motor housing of the beater, and a cam means on the support stand for the beater, which cam means are positioned across the path of movement of said control button to actuate same when the beater's motor housing is tilted back to a non-mixing position.

However, the provision of such a control button extending outwardly of the beater's motor housing poses certain additional problems incident to the mounting and dismounting the beater's motor housing from the support stand therefor, because it is the intent with appliances of this type to use same either mounted on a support stand, or dismounted from the support stand and used as a motor driven hand beater.

Thus a further object of this invention is to provide novel and improved means for mounting a beater's motor housing onto a support stand therefor.

And still another object of this invention is to provide a beater's motor housing with a control button extending outwardly therefrom through the portion of the housing normally mounted on a support stand, in combination with novel and improved means for mounting said motor housing on the support stand therefor, whereby interference between said control button and the mounting on the support stand is avoided.

The novel features which characterize the invention are set forth with particularity in the appended claims. The invention, however, both as to its organization and method of operation, together with further objects and advantages thereof, will best be understood by reference to the following description taken in connection with the accompanying drawing in which:

Figure 1 is a side elevational view showing the combination of a mixer mounted on a support stand and which combination is provided with a timing control switch.

Figure 2 is an end elevational view, partly in section and with parts broken away, showing the timing control switch.

Figure 3 is an enlarged fragmentary view taken along line 3—3 of Figure 2 and showing details of the timer actuated control of the motor energizing switch contacts;

Figure 4 is an enlarged view of the cut-off cam means cooperating with the motor energizing switch means, when the motor housing is in the non-mixing position;

Figure 5 is a fragmentary cross-section view taken on line 5—5 of Figure 3;

Figure 6 is an exploded perspective view of the elements constituting the mounting of the beater's motor housing on the support stand therefor;

Figure 7 is a cross-section view taken on line 7—7 of Figure 3;

Figure 8 is a fragmentary side elevation view, with portions broken away, showing a modified form of cut-off switch for mixer;

Figure 9 is a fragmentary view, partly in cross-section, taken along line 9—9 of Figure 8;

Figure 10 is a view taken on line 10—10 of Figure 8;

Figure 11 is a perspective view of the mounting bracket of Figure 10;

Figure 12 is a fragmentary side view of the device of Figure 8, showing the cut-off switching means when the motor housing is in the non-mixing position;

Figure 13 is a side elevation view of the device of Figure 8, showing the cut-off switching means when the motor housing is in the mixing position, and with the timer of the mixer in its "off" position.

Figure 14 is a fragmentary view similar to Figure 8 showing the spring mounted switch-control in distorted position as it would be to accommodate mounting and dismounting of the beater's motor housing on the support stand therefor.

Referring now to the drawings, there is shown in Figure 1 a mixer generally indicated at 10, which includes a mixer housing 12 and a support handle 14. The mixer housing 12 is of a construction having a split casing secured together by a plurality of threaded bolts (not shown). Within the housing 13 is a motor which is appropriately connected through gearing means so as to provide a drive for beaters 16, which preferably are removably secured to the housing 12. The foregoing features of the mixer are of generally well known construction and do not form a part of the invention.

As shown, the mixer is mounted on a support stand generally indicated at 18, and which includes a base 20 and an upright support arm 22. The base 20 is arranged to provide support for a mixing bowl 24, as is well known in the art. The upright support arm 22 is disposed laterally of the mixing bowl 24, and, in the particular construction herein, is hollow.

Adjacent the upper end of the upright support arm 22 there is a pivotally mounted bracket 26. The bracket 26 is of inverted U shape, and connects to arm 22 by means of bolt 28 which is journalled in bore 30 in support arm 22.

Means are provided for detachably connecting mixer housing 12 to the pivotally mounted bracket 26. The pivotable bracket 26 enables the mixer housing to be moved selectively into the mixing position of Figure 1 or out of said position. The said means for detachably connecting the mixer housing 12 to bracket 26 are best shown in Figures 3 to 7, and can best be visualized in Figure 6 which is an exploded perspective view.

Referring now to the details of bracket 26, it will be seen that the bight of the U shaped bracket 26, is formed to define certain elements. There is a central web portion 32 which is formed to define an aperture 34, a pair of spaced opposing edge guide flanges 36 and 38, a stop flange 40 extending upwardly across the width of central web 32, and cam surfaces 42 and 44 that are arranged in longitudinal alignment.

Secured to the underside of the mixer housing 12 is a connecting plate 46 which includes a central portion 48 of arcuate form, and lateral longitudinal flanges 50 and 52. The central portion 48 has an aperture 54 formed therein. A connecting plate 46 may be appropriately secured to the mixer housing by means of rivets or the like, and apertures 56 are shown provided for receipt of such rivets.

The arrangements of parts is such that flanges 50 and 52 are arranged to slide under the guide flanges 36 and 38 formed in web 32 of bracket 26. This arrangement restricts movement of the housing 12 with respect to bracket 26. The rearmost edge 58 of connecting plate 46 is adapted to abut the upstanding flange 40 of bracket 26, thereby limiting movement of the housing 12 longitudinally relative to bracket 26.

From the foregoing, it will be seen that it is very simple to assemble the mixer 10 onto support stand 18 by inserting the flanges 50 and 52 under the flanges 36 and 38 of the bracket 26 and sliding the mixer rearwardly until the rear edge 58 of connecting plate 46 abuts the flange 40. To disassemble the mixer from the stand, the mixer 10 is slid forward to effect disengagement of the parts.

The motor within the housing 12 is provided with an energizing circuit therefor, which includes a control switch that is located within the housing 12. An electrical lead 60 is shown leading to the control switch, which is generally indicated at 62. The switch 62 includes resilient switch blades 64 and 66 which respectively carry contacts 68 and 70. The spring blades 64 and 66 are arranged so that contacts 68 and 70 are normally engaged.

The switch blade 64 is elongated relative to switch blade 66, and carries at the extended end thereof a switch actuating member or control button 72 made of insulating material. The mixer housing 12 is apertured at 74.

Said aperture 74 is aligned with aperture 54 of connecting plate 46. The control button 72 is of such length and is so arranged that it extends through the aligned apertures 74 and 54, in the manner shown in Figure 3.

In order to facilitate assembly and disassembly of the mixer 10 and bracket 26, the portions of the bight of bracket 26 which are disposed across the path of movement of the control button 72 are bent downwardly to define cams 42 and 44 which have been heretofore described. When assembled, as shown in Figure 3, the control button 72 also extends downwardly through aperture 34 in bracket 26.

The control stand 18 carries therein a timer operated means which operates to shut off the mixer's motor after lapse of a pre-selected period of time. The timer is generally indicated at 76 and is mounted in the hollow support arm 22. An appropriate mechanism is provided, actuated by said timer, for moving a push rod 80 upwardly at the end of the timer operation so that the push rod 80 moves into engagement with the control button 72 and so as to lift control button 72 sufficiently to effect separation of switch contacts 68 and 70, to thereby open the normally closed switch and to deenergize the electric motor within housing 12. The upper end of push rod 80 is maintained in alignment with the control button 72 by disposing said portion of push rod 80 within a passageway 82 formed in the upper portion of support arm 22.

It sometimes occurs that the housewife or operator of the mixer wishes to interrupt the operation thereof, or to pivot the mixer's beaters 16 out from the mixing bowl 24 by pivoting the mixer about its pivot bolt 28. If the beaters 16 continue to operate when they are removed from the bowl 24, they splatter the material thereon all over the kitchen. Therefore, in order to eliminate such accidents, it is desirable to automatically shut off the mixer's motor when the mixer 10 is swung out of the normal mixing position. Pursuant thereto, there is provided a cam 84 formed integral with the support arm 22 and positioned across the path of movement of the control button 72. Thus, when the mixer 10 is pivoted to a position such as shown in Figure 4, the control button 72 rides up on the cam 84 so that the contacts 68 and 70 of switch 62 are separated thereby to effect deenergization of the mixer's motor.

As shown on the drawings, the cam 84 includes a straight wall portion 86 which slopes upwardly at a steep incline, and a circular wall portion 88 whose center is located at the axis of pivot bolt 28.

In the modified form of the device shown in Figures 8 to 14, the mixer 10' is provided with a motor housing 12' which is detachably connected to a pivotally mounted bracket 26' carried on the upper end of an upright hollow support arm 22'. The bracket 26' is pivotally mounted on a bolt 28' that is journaled in the support arm 22'.

The energizing circuit for the mixer's motor includes a normally closed switch generally indicated at 100, and comprises a pair of resilient switch blades 102 and 104 which respectively carry switch contacts 106 and 108. Switch blade 102 extends beyond switch blade 104, and the overhanging portion of the switch blade 102 is designated 102a.

In the form of the invention shown in Figures 1 to 7, the switch blade 64 carried a control button 72. In the modified form of the invention shown in Figures 8 to 14, the member which is operative to effect separation of the switch contacts 106 and 108 is carried by the bracket 26'.

In the modified form of the device, the bracket 26' carries an elongated rivet 110 which extends downwardly below the bight of the U shaped bracket 26'. Loosely mounted on the enlarged shank 111 of elongated rivet 110 is an elongated arm 112 which is formed to define a manually engageable flange 114 at the end thereof. The arm 112 carries an elongated control finger, or stem, 116 made of insulating material. The finger 116 extends upwardly through aligned apertures 118 in bracket 26' and 120 in mixer housing 12'.

The rivet 110 also loosely carries an angularly shaped spring member 122 which is adapted to engage the underside of arm 112. The spring 122 is apertured at 124 to accommodate passage therethrough of a push rod 80' which is operated by a timer mechanism not shown. When the push rod 80' is raised from its position in Figure 8, when the timer is in a position to shut off operation of the mixer, then the push rod is effective to push arm 112 upwardly and force the control stem, or button, into engagement with portion of 102a of switch blade 102, to thereby effect separation of contacts 106 and 108, and to deenergize the mixer's motor.

The upper end of the support arm 22' is provided with a cam 84' which acts through spring 122 to automatically open switch 100 when the mixer is tilted back, about pivot bolt 28', out of mixing position. This is best shown in Figure 12 where the elbow portion 123 of spring 122 is shown in engagement with cam 84'. Such engagement is operative to lift spring 122 on rivet 110, and the engagement of spring 122 with arm 112 operates to force control button 116 into switch opening engagement with switch blade 102.

The arrangement of parts for accommodating assembly and disassembly of the mixer 10' onto the bracket 26' is slightly different than in the first disclosed form of the invention. In the modified form of the invention, the bracket 26' is provided, on the bight thereof, with a structure defining a pair of converging flanges 126 and 128, which cooperate to define a tapered socket therebetween. A connecting plate 130, which is secured on the underside of housing 12' is provided with converging flanges 132 and 132a, which are adapted to be slid under the flanges 126 and 128 formed on bracket 26'. The arrangement is such that there is effected a wedging connection between the connecting plate 130 and the tapered socket formed between converging flanges 126 and 128 of bracket 26'. Movement of the mixer 10' forwardly releases the wedging action and permits disconnection of the mixer from the support stand thereof.

In the assembly and disassembly of the mixer 10' from the support stand 22' therefor, in the form of the invention shown in Figures 8 to 14, it is necessary to depress the control button 116 out of the path of travel of the connecting plate 130, before each assembly and disassembly can be effected. In Figure 14 there is shown how the arm 112 may be distorted downwardly by manually depressing flange 14 to effect withdrawal of the control button 116 to a position which permits assembly and disassembly of the mixer with respect to the mounting bracket 26'.

In both forms of the invention herein disclosed it will be seen that when the mixer is disconnected from the support stand therefor, the control switch is normally closed and thus the mixer may be used manually as a hand supported mixer.

While there has been shown and described a particular embodiment of this invention, it will be apparent to those skilled in the art that various changes and modifications may be made therein without departing from the invention; and therefore it is intended in the appended claims to cover all such changes and modifications as fall within the true spirit and scope of this invention.

I claim:

1. A mixing apparatus comprising, in combination, a base, a support stand extending upwardly from said base, a mixer housing having an electrically energized mixer motor therein, means detachably connected to said mixer housing and pivotally mounted on said support stand for enabling said mixer housing to be selectively pivoted into a mixing position or out of said mixing position, an energizing circuit for said mixer motor including a normally closed control switch therefor within said mixer housing, switch actuating means operatively associated with said control switch and adapted when actuated, to open said switch when the mixer housing is in its mixing position, movable control means positioned to move against and actuate said switch actuating means to open said control switch to shut off the mixer when the mixer is in the mixing position, and cam means on said support stand positioned to be engaged by said switch actuating means to effect opening of said control switch to de-energize the mixer motor when the mixer housing is pivoted out of said mixing position.

2. A mixing apparatus comprising, in combination, an electrically energized mixer including a normally closed control switch therefor carried by said mixer, support means detachably connected to said mixer, means pivotally mounting said mixer on said support means for selective pivoting into a mixing position and out of said mixing position, switch actuating means operatively associated with said control switch and carried by said mixer and adapted, when actuated, to open said control switch and shut off the mixer, movable control means carried by said support means and positioned to move against and actuate said switch actuating means to open said control switch to shut off the mixer when the mixer is in the mixing position, and cam means on said support means positioned to cooperate with said switch actuating means, when the mixer is pivoted out of its mixing position, to open said control switch and shut off the mixer.

3. A mixing apparatus comprising, in combination, an electrically energized mixer including a normally closed control switch therefor, support means for said mixer, means pivotally mounting said mixer on said support means for selective pivoting into a mixing position and out of said mixing position, switch actuating means operatively associated with said control switch and adapted, when actuated, to open said control switch and shut off the mixer, cam means on said support means positioned to cooperate with said switch actuating means, when the mixer is pivoted out of its mixing position, to open said control switch and shut off the mixer, and control means positioned to engage and actuate said switch actuating means to open said control switch to shut off the mixer when the mixer is in the mixing position.

4. A mixing apparatus comprising, in combination, an electrically energized mixer including a normally closed control switch therefor, support means for said mixer, means pivotally mounting said mixer on said support means for selective pivoting into a mixing position and out of said mixing position, a control button operatively associated with said control switch and protruding from said mixer, said button adapted to be engaged and actuated to open said control switch, control means carried by said support means and operative to engage and actuate said protruding control button to shut off the mixer when the mixer is in the mixing position, and cam means on said support means and positioned to engage and actuate said protruding control button to shut off the mixer when the mixer is pivoted out of the mixing position.

5. A mixing apparatus comprising, in combination, an electrically energized mixer carrying a normally closed control switch therefor, a support stand for said mixer, a bracket pivotally mounted on said support stand and adapted to have said mixer detachably connected thereto, means defining openings in said bracket and mixer which are in register when the mixer is properly mounted on said bracket, a switch actuating member operatively associated with said control switch and extending through said registered openings and adapted, when actuated, to open said control switch and shut off the mixer, control means carried by said support stand and operative to actuate said switch actuating member to open said control switch and shut off the mixer when the mixer is in its mixing position, and cam means on said support stand positioned to cooperate with said switch actuating member to open said control switch and shut off the mixer, when the mixer is pivoted out of the mixing position.

6. A mixing apparatus comprising, in combination, an electrically energized mixer carrying a normally closed control switch therefor, a support stand for said mixer, a bracket pivotally mounted on said support stand and adapted to have said mixer detachably connected thereto, means defining openings in said bracket and mixer which are in register when the mixer is properly mounted on said bracket, a switch actuating member operatively associated with said control switch and extending through said registered openings and adapted, when actuated, to open said control switch and shut off the mixer, control means carried by said support stand and operative to actuate said switch actuating member to open said control switch and shut off the mixer when the mixer is in its mixing position, cam means on said support stand positioned to cooperate with said switch actuating member to open said control switch and shut off the mixer, when the mixer is pivoted out of the mixing position, and said switch actuating member being carried by said mixer.

7. A mixing apparatus comprising, in combination, an electrically energized mixer carrying a normally closed control switch therefor, a support stand for said mixer, a bracket pivotally mounted on said support stand and adapted to have said mixer detachably connected thereto, means defining openings in said bracket and mixer which are in register when the mixer is properly mounted on said bracket, a switch actuating member operatively associated with said control switch and extending through said registered openings and adapted, when actuated, to open said control switch and shut off the mixer, control means carried by said support stand and operative to actuate said switch actuating member to open said control switch and shut off the mixer when the mixer is in its mixing position, cam means on said support stand positioned to cooperate with said switch actuating member to open said control switch and shut off the mixer, when the mixer is pivoted out of the mixing position, and said switch actuating member being carried by said bracket.

8. A mixing apparatus comprising, in combination, an electrically energized mixer carrying a normally closed control switch therefor, a support stand for said mixer, a bracket pivotally mounted on said support stand and adapted to have said mixer detachably connected thereto, means defining openings in said bracket and mixer which are in register when the mixer is properly mounted on said bracket, a switch actuating member operatively associated with said control switch and extending through said registered openings and adapted, when actuated, to open said control switch and shut off the mixer, control means carried by said support stand and operative to actuate said switch actuating member to open said control switch and shut off the mixer when the mixer is in its mixing position, cam means on said support stand positioned to cooperate with said switch actuating member to open said control switch and shut off the mixer, when the mixer is pivoted out of the mixing position, tongue and groove means for effecting and affording connection and disconnection of said mixer and bracket, and stop means on said bracket limiting movement of said mixer relative to said bracket during assembly thereof.

9. A mixing apparatus comprising, in combination, an electrically energized mixer carrying a normally closed control switch therefor, a support stand for said mixer, a bracket pivotally mounted on said support stand and adapted to have said mixer detachably connected thereto, means defining openings in said bracket and mixer which are in register when the mixer is properly mounted on said bracket, a switch actuating member operatively associated with said control switch and extending through said registered openings and adapted, when actuated, to open said control switch and shut off the mixer, control means carried by said support stand and operative to actuate said switch actuating member to open said control switch and shut off the mixer when the mixer is in its mixing position, cam means on said support stand positioned to cooperate with said switch actuating member to open said control switch and shut off the mixer, when the mixer is pivoted out of the mixing position, tongue and groove means for effecting and affording connection and disconnection of said mixer and bracket, stop means on said bracket limiting movement of said mixer relative to said bracket during assembly thereof, said switch actuating member being carried by said mixer, and cam means on said bracket, in the path of movement of said switch actuating member carried by said mixer, for facilitating connection and disconnection of said mixer and bracket.

10. A mixing apparatus comprising, in combination, an electrically energized mixer carrying a normally closed control switch therefor, a support stand for said mixer, a bracket pivotally mounted on said support stand and adapted to have said mixer detachably connected thereto, means defining openings in said bracket and mixer which are in register when the mixer is properly mounted on said bracket, a switch actuating member operatively associated with said control switch and extending through said registered openings and adapted, when actuated, to open said control switch and shut off the mixer, control means carried by said support stand and operative to actuate said switch actuating member to open said control switch and shut off the mixer when the mixer is in its mixing position, cam means on said support stand positioned to cooperate with said switch actuating member to open said control switch and shut off the mixer, when the mixer is pivoted out of the mixing position, a lever arranged for selective manual manipulation and carried on the underside of said bracket, said lever carrying the switch actuating member, a spring member carried by said bracket and arranged to engage and maintain said switch actuating member in a position extending through the aligned apertures in the bracket and mixer, said lever being adapted to be manipulated against the spring to permit withdrawal of the switch actuating member to an inoperative position to permit connection and disconnection of the mixer and bracket, and said spring member adapted to be actuated by said cam means to actuate said lever and switch actuating member to a position to open said control switch when the mixer is pivoted out of said mixing position.

11. A device as set forth in claim 3 including a timer operatively associated with said control means, for actuating said control means and the switch controlled thereby after lapse of a preselected time interval when the mixer is in the mixing position.

References Cited in the file of this patent
UNITED STATES PATENTS

| 2,462,089 | Frisbie | Feb. 22, 1949 |
| 2,616,673 | Guilder | Nov. 4, 1952 |
| 2,671,191 | Braski | Mar. 2, 1954 |
| 2,789,798 | Brace | Apr. 23, 1957 |